(12) United States Patent
Zhang et al.

(10) Patent No.: US 11,900,448 B2
(45) Date of Patent: Feb. 13, 2024

(54) LIQUIDITY ENGINE

(71) Applicant: STRIPE, INC., San Francisco, CA (US)

(72) Inventors: Qi Zhang, Foster City, CA (US); Jeremiah Clemenson, San Francisco, CA (US); Katherine Yu, San Francisco (CA); Albert Koy, San Francisco, CA (US); Andrew Straussman, Plymouth, MN (US); Eric Zhang, San Francisco, CA (US); Jordan McQueen, Seattle, WA (US); Yiran Gao, Palo Alto, CA (US)

(73) Assignee: STRIPE, INC., South San Francisco, CA (US)

( * ) Notice: Subject to any disclaimer, the term of this patent is extended or adjusted under 35 U.S.C. 154(b) by 112 days.

(21) Appl. No.: 17/382,089

(22) Filed: Jul. 21, 2021

(65) Prior Publication Data

US 2023/0021606 A1 Jan. 26, 2023

(51) Int. Cl.
*G06Q 40/02* (2023.01)
*G06Q 40/04* (2012.01)
*G06N 5/04* (2023.01)
*G06N 20/00* (2019.01)

(52) U.S. Cl.
CPC ............. *G06Q 40/02* (2013.01); *G06N 5/04* (2013.01); *G06N 20/00* (2019.01); *G06Q 40/04* (2013.01)

(58) Field of Classification Search
CPC .............................. G06Q 40/04; G06Q 40/02
USPC .......................................................... 705/37
See application file for complete search history.

(56) References Cited

U.S. PATENT DOCUMENTS

| | | | | |
|---|---|---|---|---|
| 7,680,730 | B2* | 3/2010 | Szewczyk | G06Q 40/02 705/42 |
| 8,630,879 | B1 | 1/2014 | Hendrix et al. | |
| 8,666,860 | B2* | 3/2014 | Golding | G06Q 20/381 705/37 |
| 2004/0236646 | A1 | 11/2004 | Wu et al. | |
| 2009/0150281 | A1 | 6/2009 | Ellis et al. | |
| 2012/0011048 | A1* | 1/2012 | Golding | G06Q 40/02 705/37 |

(Continued)

OTHER PUBLICATIONS

International Search Report and Written Opinion on the Patentability of Application No. PCT/US2022/037811 dated Nov. 10, 2022, 10 pages.

*Primary Examiner* — Lindsay M Maguire
(74) *Attorney, Agent, or Firm* — Womble Bond Dickinson (US) LLP

(57) ABSTRACT

A method and apparatus for managing liquidity when processing transactions are disclosed. In some embodiments, the method is implemented by a computing device and comprises: receiving data for a plurality of transactions; continuously reading in and aggregating, with an aggregator implemented at least partially in hardware of the computing device, transactions to produce one or more netted currency positions based on a plurality of properties of the transactions and on a plurality of netting constraints; generating one or more tasks, using a trade generator implemented at least partially in hardware of the computing device, to route cash movements as one or more batched fund transfers based on one or more trading policies; and sending the one or more tasks via network communications to one or more entities to execute the batched fund transfers.

12 Claims, 8 Drawing Sheets

(56) References Cited

U.S. PATENT DOCUMENTS

| | | |
|---|---|---|
| 2012/0078776 A1 | 3/2012 | Pechenik et al. |
| 2013/0031002 A1* | 1/2013 | Hibbard ................. G06Q 20/10 705/44 |
| 2016/0012465 A1* | 1/2016 | Sharp ................... G06Q 20/321 705/14.17 |
| 2020/0402156 A1 | 12/2020 | Maitra et al. |
| 2021/0090041 A1* | 3/2021 | Hibbard ................. G06Q 20/10 |

* cited by examiner

Represents a currency position as a node in a liquidity graph in which each node includes a funds-in leg and a funds-out leg
611

Predicts funds for the funds-in leg as a prediction an amount of funds to land in an account at a future date
612

Aggregates the funds for the funds-in leg and the funds-out leg into netted positions
613

Generates one or more tasks to route cash movements as one or more batched fund transfers based on one or more trading policies
614

FIG. 6B

LIQUIDITY ENGINE

FIELD OF THE INVENTION

Embodiments of the present invention relate to the field of systems for processing financial transactions; more particularly, embodiments of the present invention relate to computing capital requirements and generating trades to address cash imbalances.

BACKGROUND OF THE INVENTION

In the payment industry, payment processors tends to only provide payouts after pay-ins are settled in their corporate bank account. Some payment processors want to promise users access to funds at a time, currency or location regardless of the actual settlement from card networks. For example, it's possible that the actual settlement is on August 13th, in a United States Dollars (USD) bank account at a US legal entity, but the payment processor promises to the user the funds will be available on August 12th, in a European (EURO) bank account from a European Union (EU) legal entity. To enable the payment processor to meet such promises, the payment processor needs to move money across the globe, and thus a system to balance cash positions timely, efficiently, and reliably is needed.

SUMMARY

A method and apparatus for managing liquidity when processing transactions are disclosed. In some embodiments, the method is implemented by a computing device and comprises: receiving data for a plurality of transactions; continuously reading in and aggregating, with an aggregator implemented at least partially in hardware of the computing device, transactions to produce one or more netted currency positions based on a plurality of properties of the transactions and on a plurality of netting constraints; generating one or more tasks, using a trade generator implemented at least partially in hardware of the computing device, to route cash movements as one or more batched fund transfers based on one or more trading policies; and sending the one or more tasks via network communications to one or more entities to execute the batched fund transfers.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 6B is a flow diagram of another embodiment of a process for processing transaction with a liquidity engine.

DETAILED DESCRIPTION

Figure 1:
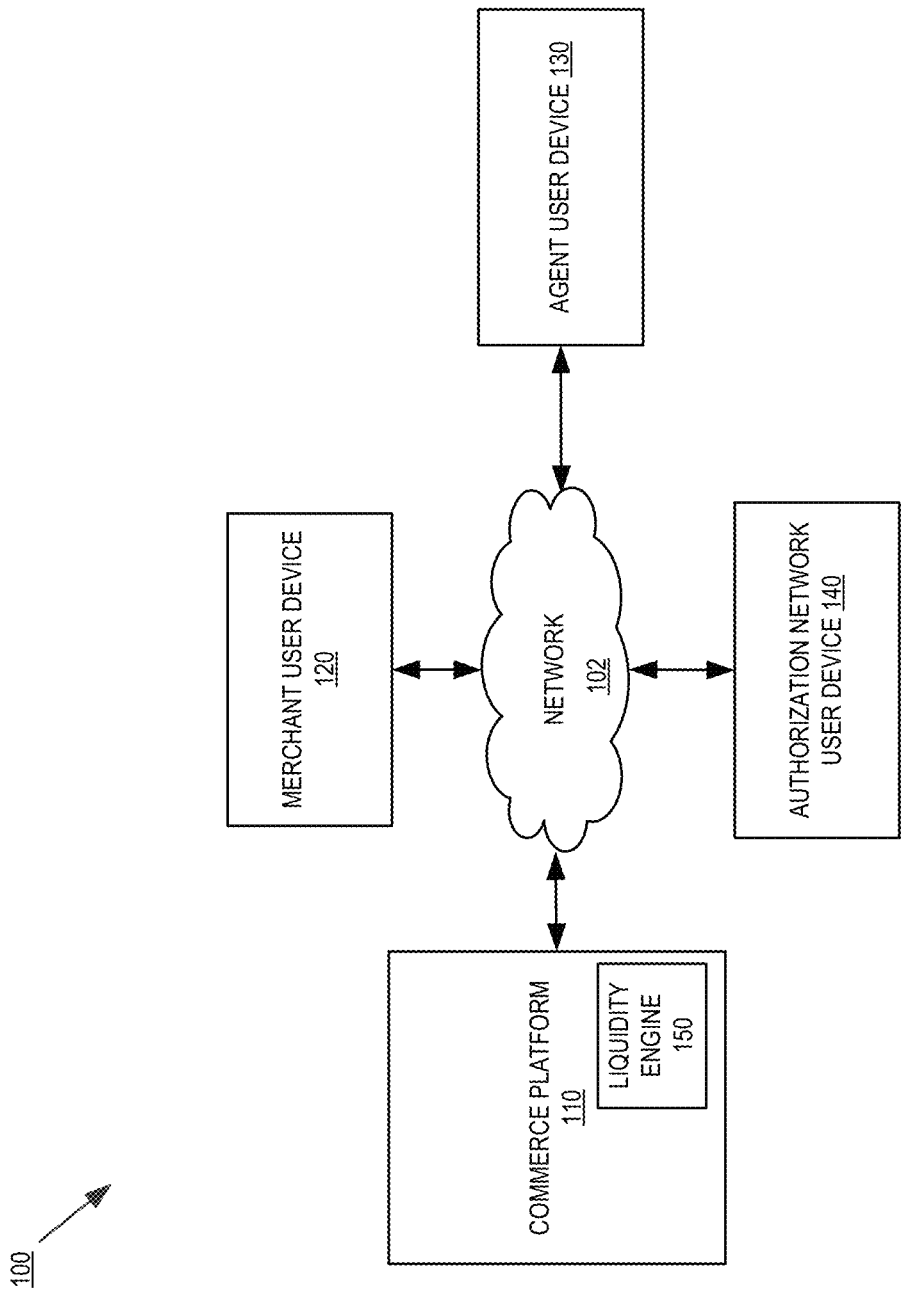
FIG. 1 is a block diagram of an exemplary system architecture for a commerce platform having a liquidity engine.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, to avoid obscuring the present invention.

Techniques are disclosed herein for a payment processor to manage liquidity, mitigate currency risk, and improve, and possibly optimize, deployment of capital to meet promise to users to provide users access to funds at a time, currency or location regardless of the actual settlement from card networks. In one embodiment, the techniques are achieved using a liquidity engine. In one embodiment, the liquidity engine is a centralized system to provide liquidity for payment processor products at the right time (e.g., promised time after transaction occurs, etc.), place (e.g., bank), and currency while ensuring efficiency and compliance. In one embodiment, the liquidity engine aggregates transaction level commitment related to funds to compute an overview of the capital requirements that are necessary to provide payment to the users (e.g., payment processor's customers). In one embodiment, the commitment corresponds to the time a payment processor agreed to provide a payment processor customers funds for settlement of a transaction. In one embodiment, as part of the transaction level aggregation, the liquidity engine nets out cash imbalance as much as possible (under legal & business constraints) and determines a plan (e.g., a cost-effective plan) to route various types of cash movement.

In one embodiment, the liquidity engine manages liquidity, including the deployment of capital, by using, as a system input, predicted inventory data associated with transactions that are expected to settle prior to their actual settlement, where the predicted inventory data is information indicative of funds that are expected to be received for settling from customers or users of services and/or products of customers of the payment processor. In one embodiment, the liquidity engine determines the predicted inventory data using machine learning (ML)-backed predicted inventory. This allows for calculating an expected cash imbalance as a result of aggregating the transaction level data. In one embodiment, the liquidity engine plans actions (e.g., cash transfers or trades, etc.) to balance the cash positions in view of the calculated expected cash imbalance.

In one embodiment, the liquidity engine performs the process of volume aggregation on the transactions and the process of cash movement planning separately. This is beneficial in that it allows the process of performing volume aggregation to independently scale as volume grows, while allowing the liquidity engine planning process to flexibility implement a cash movement strategy devised separately by the payment processor.

In one embodiment, because the cash movement planning process is independent of the volume aggregation, the liquidity engine can perform the cash movement process more efficiently. In one embodiment, the efficiency comes from currency level netting, in that only as much money as needed is moved after netting. In one embodiment, and as explained in more detail below, the liquidity engine uses a liquidity graph as part of performing the planning process and represents the currency position (e.g., per a combination of currency, location, and availability date) as a node in a liquidity graph. An incoming transaction will add an edge in the graph, and the two ends of the edge will comprise the transaction level data on both the funds-in and funds-out legs. For a payment, the liquidity engine receives transaction information that specifies when, where, and how much the pay-in is expected to land and when, where, and how much the pay-out is promised to be available. As transactions come in, the liquidity engine modifies the currency positions on the two ends of the edge and perform the netting process continuously, thereby using prediction to manage its liquidity position.

As the liquidity engine is continuously performing the netting process as a centralized system, the liquidity engine is aware of all funds-flows connected to a payment processor's corporate bank account and avoids different systems withdrawing from the same bank account. This makes for a much more reliable system.

Note that use of the liquidity engine described herein is different from current practices where banks do currency-pair level netting but not currency level. For example, banks aggregate the USD/EUR transactions, and net that with EUR/USD transactions. In one embodiment, the liquidity engine uses a model that allows netting at currency level. This allows the liquidity engine to net at USD-level given USD/EUR and CAD/USD transactions, whereas many banks can't do that.

FIG. 1 is a block diagram of an exemplary system 100 architecture for a commerce platform having a liquidity engine 150. In one embodiment, system 100 includes a commerce platform 110, a merchant user device 120, an agent user device 130, and an authorization network user device 140. In one embodiment, user devices (e.g., devices 120, 130, and 140) may be mobile computing devices, such as a smartphone, tablet computer, smartwatch, etc., as well computer systems, such as a desktop computer system, laptop computer system, server computer systems, etc. The commerce platform 110 may also be one or more computing devices, such as one or more server computer systems, desktop computer systems, etc.

The commerce platform 110, merchant user device 120, agent user device 130, and authorization network user device 140 may be coupled to a network 102 and communicate with one another using any of the standard protocols for the exchange of information, including secure communication protocols. In one embodiment, one or more of the commerce platform 110, merchant user device 120, agent user device 130, and authorization network user device 140 may run on one Local Area Network (LAN) and may be incorporated into the same physical or logical system, or different physical or logical systems. Alternatively, the commerce platform 110, merchant user device 120, agent user device 130, and authorization network user device 140 may reside on different LANs, wide area networks, cellular telephone networks, etc. that may be coupled together via the Internet but separated by firewalls, routers, and/or other network devices. In one embodiment, commerce platform 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform provides financial processing services to one or more of merchant user device 120, agent user device 130, and/or authorization network user device 140, such as managing accounts, running financial transactions, clearing transactions, performing payouts to agents, managing merchant and/or agent accounts, as well as other services typically associated with commerce platforms systems such as, for example, STRIPE™.

In embodiments, commerce platform 110 is configured to provide financial processing services, including payment processing services, using a liquidity engine 150 as described herein. Additional details of the liquidity engine are described in more details below.

Example Embodiments of the Liquidity Engine

As discussed above, in one embodiment, the payment processor may promise one or more users (e.g., payment processor's customers) access to funds related to settling transactions at a different time, currency or location than the actual settlement of a transaction occurs. In doing so, the payment processor incurs risk at the user transaction level by making a commitment that might not be able to be fulfilled later. Because of this, capital buffers with large amounts of capital may be required to mitigate this risk. This is increasingly unsustainable as transaction volume for the payment processor grows.

To that end, in one embodiment, the liquidity engine 150 disclosed herein provides a centralized system that tracks all funds-flows connected to a payment processor bank account and dynamically and efficiently balances the cash positions of the payment processor, while being able to continue to attribute cash movement to the original transactions. In one embodiment, the liquidity engine 150 frequently calculates the payment processor's liquidity risk, and then takes actions to mitigate risk and optimize the payment processor's cash positions. Note that, in one embodiment, the liquidity engine 150 provides sound attribution from cash to the original transactions is critical to provide explainability for accounting, finance, legal, and tax purposes. Thus, in one embodiment, the liquidity engine 150 acts as a funding and currency risk control system that is responsible to calculate and mitigate liquidity risk for a payment processor.

In one embodiment, the liquidity engine 150 performs three functions: plan and route cash movement, integrate with financial partners, and provides operational and analytical observability.

With respect to planning and routing cash movement, the liquidity engine 150 aggregates transaction level commitment to compute an overview of the capital requirements of the payment processor. The liquidity engine 150 then determines how to net out any cash imbalance as much as possible (under legal & business constraints) and a cost-effective plan to route various types of cash movement. As part of the process, the liquidity engine 150 integrates with one or more banks for hedging, in order to get competitive rates or geographic coverage for any trades that are generated as part of the cash movement process. In one embodiment, the liquidity engine 150 integrates with a different bank for receivable financing, to sell "slow" receivables and gain access to funds faster than otherwise settled by the networks. As for operational and analytical observability, in one embodiment, the liquidity engine 150 provides live operational observability, such as, for example, but not limited to, instructed cash movement and reconciliation, near future liability, currency exposure, and to-be-balanced cash positions. In one embodiment, the liquidity engine 150 provides off-line analytical observability to derive business insight, such as, for example, per funds-flow merchant float or profit and loss determinations.

In one embodiment, the liquidity engine 150 is responsible for initiating and optimizing all money movements in a controlled and compliant manner, that are internal to the payment processor, including movements needed for regulatory compliance (e.g., safeguarding, reserves, etc.). In one embodiment, the liquidity engine 150 aggregates transaction level commitment to compute an overview of the payment processor capital requirements. The liquidity engine 150 determines how to net out cash imbalance as much as possible (under legal & business constraints) and then determines a plan (e.g., a cost-effective plan) to route various types of cash movement.

Figure 2:
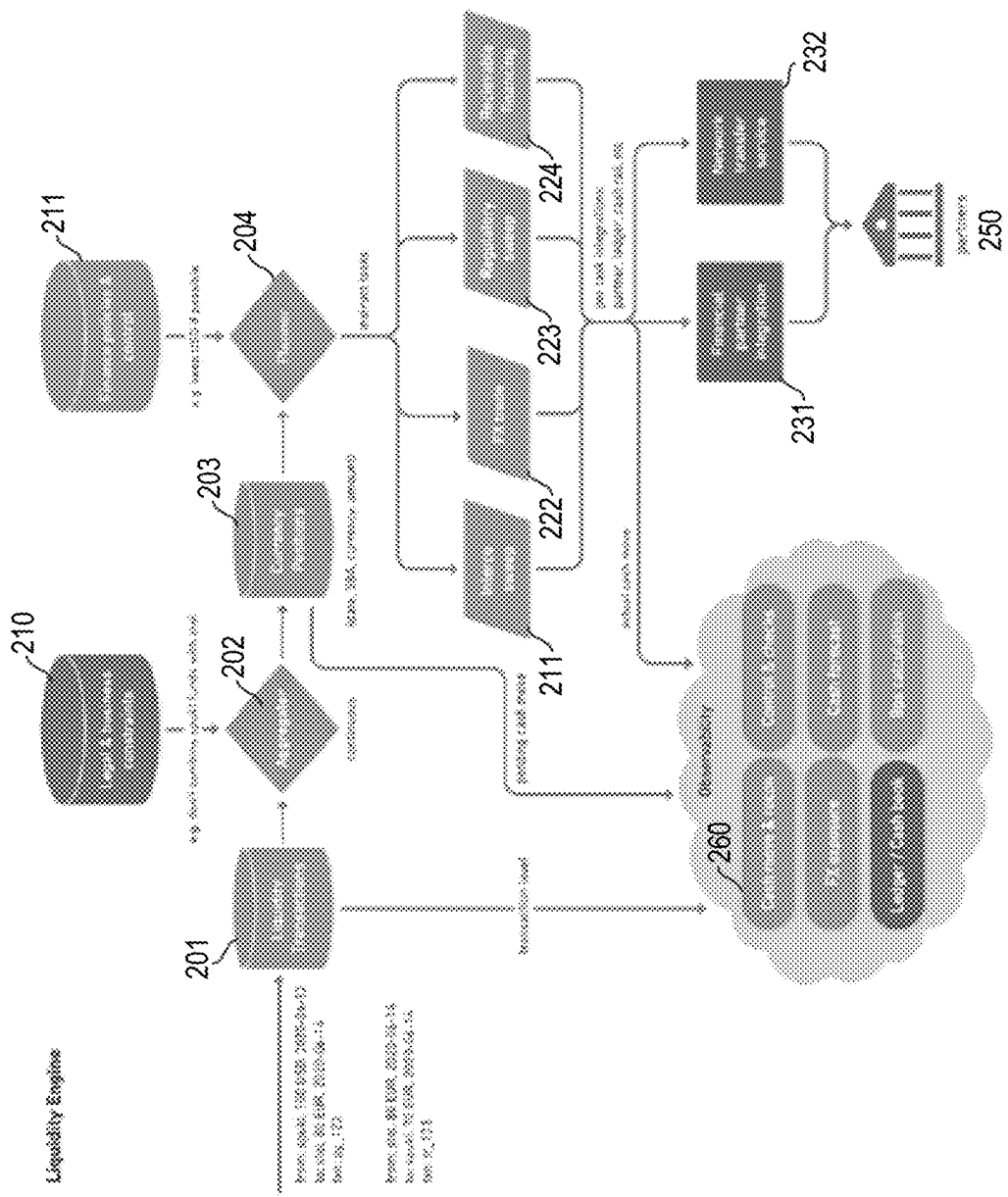
FIG. 2 is a data flow diagram of one embodiment of a liquidity engine.

FIG. 2 is a data flow diagram of one embodiment of a liquidity engine (e.g., liquidity engine 150). In one embodiment, the processes performed by the liquidity engine are performed, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 2, liquidity transactions 201 are received by the liquidity engine. In one embodiment, liquidity transactions 201 are received on a network (e.g., Internet, WAN, etc.) interface. In one embodiment, liquidity engine 201 receives liquidity transactions using a sweeper that sweeps unprocessed records at predetermined intervals (e.g., every 5 minutes). In another embodiment, liquidity engine 201 obtains liquidity transactions via streaming. In one embodiment, the liquidity transactions 201 involve ML-based predicted funds. In another embodiment, data from the liquidity transactions 201 are used to generate the ML-based predicted funds.

In one embodiment, the liquidity engine consumes events and relies on tags to determine the required movements, timing and regulatory environments of each event. In one embodiment, the liquidity engine segments events into buckets, or for aggregation and planning. In one embodiment, the events are segmented based on tagging that maps events to their cash implications. The tagging operates as a cash flow abstraction at the funds flow level. In one embodiment, each event is expressed as a tag and the tag includes enough information that the liquidity engine, along with other data (e.g., merchant data), to uniquely determine the set of payment processor bank accounts payment processor bank account (e.g., Stripe bank account (SBA), etc.) implicated in the cash movements related to a transaction. In one embodiment, each tag has a type and each type contains a different set of fields specific to that type of movement that is necessary for uniquely determining the cash movements involved. Below is an example list of types and fields of tags that are associated with each event that corresponds to a financial transaction.

1. Acquiring (Charge/payment/refund/dispute)
    a) Acquiring Entity
    b) Rail/BIN/etc. (e.g., enough to uniquely determine settlement account)
    c) Settlement Currency
    d) Merchant Entity
    e) Merchant Payout Currency
    f) Event covered with receivables financing?
    g) Other connect related fields (e.g., connect merchant entity/currency, etc.)
2. Payout
    a) Payout entity
    b) Payout currency
    c) Type (e.g., instant, cross-border, cross-currency, etc.)/Rail/BIN/etc. (enough to uniquely determine payout account and flow)
3. Connect Transfer
    a) Platform Entity
    b) Platform Currency
    c) Account Entity
    d) Account Currency
4. Issuing charge
5. Top up
6. Inbound payment
7. Vendor payment
8. Balance conversion
9. Additional—Treasury, Corporate card, Capital, etc.).

In one embodiment, the liquidity transactions are provided by a consumer engine (not shown) that obtains the transactions (e.g., consumes events) and converts them to "liquidity positions" in specific bank accounts maintained by the payment processor (e.g., Stripe bank accounts (SBAs)) at specific times. In one embodiment, the liquidity positions are incoming and outgoing cash amounts in specific payment processor bank accounts (e.g., SBAs). In one embodiment, the consumer engine filters the events for which the liquidity engine is responsible based on the tagging, maps those to payment processor bank accounts, determines any unspecified timing constraints, and assigns the "positions" across planning groups (described below). For example, the consumer engine converts a $10 Transfer from account A to account B into two positions (e.g., a +$10 surplus position in account A and a −$10 deficit position in account B), which would be grouped together into one of liquidity transactions 201. Thus, in one embodiment, the consumer engine consumes event streams of transactions, filters those down to the events that would be handled or otherwise supported by the liquidity engine, maps each of those events a set of positions for specific payment processor bank accounts, and emits a liquidity transaction object containing the positions to aggregator 202.

In one embodiment, all inputs to the liquidity engine are events provided to the liquidity engine in a streaming fashion. In another embodiment, the events are provided off-line as batch jobs to calculate liquidity positions.

In one embodiment, the input data source includes transaction level availability data on both the funds-from and funds-to legs for a graph-based model. In one embodiment, the fund-in leg comprises ML-based predicted funds.

In one embodiment, aggregator 202 periodically and continuously reads in batches of liquidity transactions 201 and sums over them to produce currency positions 203. In one embodiment, currency positions 203 comprise netted currency positions. In other words, aggregator 202 operates as a netting engine that receives unprocessed records and aggregates a netted amount for a given currency. In one embodiment, the currency positions are specified as (currency, entity) positions. By performing the aggregation and updating currency positions, aggregator 202 allows the payment processor to know what they can trade.

In one embodiment, aggregator 202 receives inputs specifying legal and business constraints and performs aggregation in accordance with legal and business constraints. For example, while there could be more netting opportunities if funds could be combined from two entities, when the legal and business contracts are not set up for that, aggregator 202 does not aggregate those funds together.

Aggregator 202 operates is a decoupled manner with respect to the planning of cash movement operations to handle current positions 203.

Planner 204 receives and periodically examiners currency positions 203 to determine one or more cash movement tasks to execute. In one embodiment, the cash movement tasks are trades, and thus, planner 204 acts as a trade generator to create trades with one or more banking partners in response to the netted currency positions. In one embodiment, planner 204 performs the determinations with respect to the cash movement tasks or trades subject to Treasury and/or finance policies 211 that are stored in a database. For example, some types of tasks can only be performed once a day while others can be performed more frequently. In one example policy, planner 204 may try to generate one or more cash movement tasks that results in one or more trades designed to maintain US dollars to the extent possible.

In one embodiment, planner 204 may use a threshold to check if the current volume is trade worthy. In one embodiment, planner 204 generate trades using the following algorithm:

1) Convert each currency's position to their USD equivalent, using the current midmarket rate.
2) Find the current largest deficit currency and select a surplus currency to sell in order to buy the deficit currency. As a start point and for illustration purposes, the largest surplus currency to sell is selected. Alternatively, other policies may be used such as policies to select a currency that has been designated as one to get rid of or selecting most favorable currencies that is desirable to hold.
3) Create an in-memory trade between the currency pair using best rate available, and update the position of the currency pair.
4) Repeat 2 and 3 until there is no more deficit or no more surplus currencies.
5) Sanity check the numbers.
6) Send trade requests to one or more bank partners and record in a database and the ledger.

In one embodiment, planner 204 instructs one of a plurality of tasks that include inter-company sweep task 221, foreign exchange (FX) trade task 222, a regulatory sweep task 223 (e.g., a task to automatically transfer funds for regulatory reason(s)), and a receivable financing task 224. These tasks may be directed to partners 250 (e.g., banks, etc.) through one or more financial partner integrations 231 and one or more network transfer services 232.

An FX trade task 222 is used to balance the cash positions between currencies. This is needed when the funds settled into an account are in a different currency from the payout's currency. For example, the following are two of liquidity transactions 201 from FIG. 2:

from: spukl, 100 USD, 2020-06-12
to: stel, 80 EUR, 2020-06-14
txn: py_123
from: stel, 80 EUR, 2020-06-14
to: spukl, 70 EUR, 2020-06-14
txn: tr_123

In one embodiment, the liquidity engine controls which fund flows are aggregated, netted and planned together using planning groups. A planning group is a unit of scheduling, configuration, and isolation. Liquidity transactions 201 that are assigned to the same planning group are dealt with independently from those in other planning groups. Thus, the planning groups connect the aggregation and planning together. Note that in one embodiment, each position that is part of a liquidity transaction 201 belongs to a single planning group, and the connections between the planning groups exist solely as the timing specified on each position (of the two positions).

Planning groups are the groups across which the planning runs and there are a set of available actions that can be taken during that run. In one embodiment, planner 204 operates on planning groups, and each planning group is planned and executed independently and on its own schedule. The job of planner 204 in each "run" of a planning group, is to try and satisfy as many of the upcoming deficits as possible using the known surpluses and available actions. In one embodiment, each planning group is independently responsible for hitting its own liquidity requirements and they don't interact. Each time planner 204 runs a planning group, planner 204 generates a Run object capturing the input, output, and debugging details of the run. That is, the cash movements within each planning group are planned by planner 204 and executed independently and on their own schedules.

Figure 3:
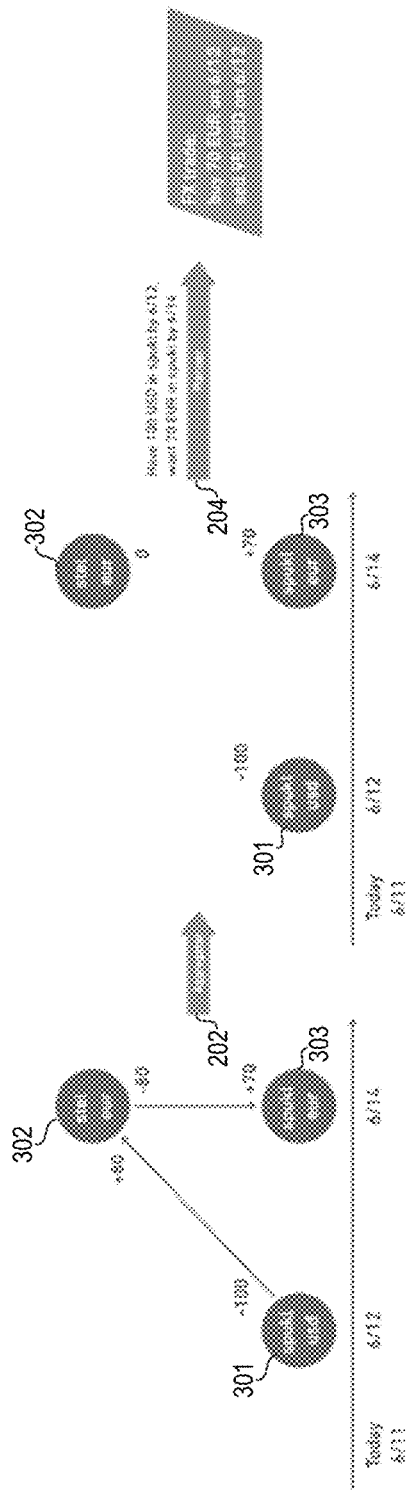
FIG. 3 illustrates an example of a graph representing the two transactions.

In one embodiment, the liquidity transactions represent them as the two edges in the graph. FIG. 3 illustrates an example of a graph representing the two transactions. Referring to FIG. 3, three nodes 301-303 of the graph are shown. Node 301 (spukl usd) has an out leg to node 302 (stel eur) that has −100 USD, node 302 has an in leg from node 301 with a +80 EUR and an out leg to node 303 (spukl eur) with a −80 EUR, and node 303 has an in leg with +70 USD.

Aggregator 202 aggregates the transactions to the currency positions for both the in and out legs to a netted position of −100 USD for node 301, a netted position of 0 EUR for node 302, and a netted position of +70 for node 303. Assuming today is June 11, planner 204 looks at the aggregated positions, determines to issue an FX trade to sell USD and buy EUR, and contracts with the bank partner 250 to make the cash exchange on June 12. Thus, planner 204 plans and schedules an FX trade task for a trade involving buying 70 EUR on June 12 and selling 95 USD on June 12.

Note that even though in one embodiment, the payment processor only needs the cash for payout as late as June 14, the liquidity engine creates a task to make the cash exchange happen as soon as the payment processor has the settled pay-in to sell. This is because the earlier the value date the better rate the payment processor gets from banks (further out value date incurs more risk for the bank).

An inter-company task 221 is for handling Inter-company liability. Inter-company liability in this context means funds settled in one legal entity, but needs to be paid out in another entity. This is very similar to FX hedging task except that there is no currency exchange, but there is a location change.

Figure 4:
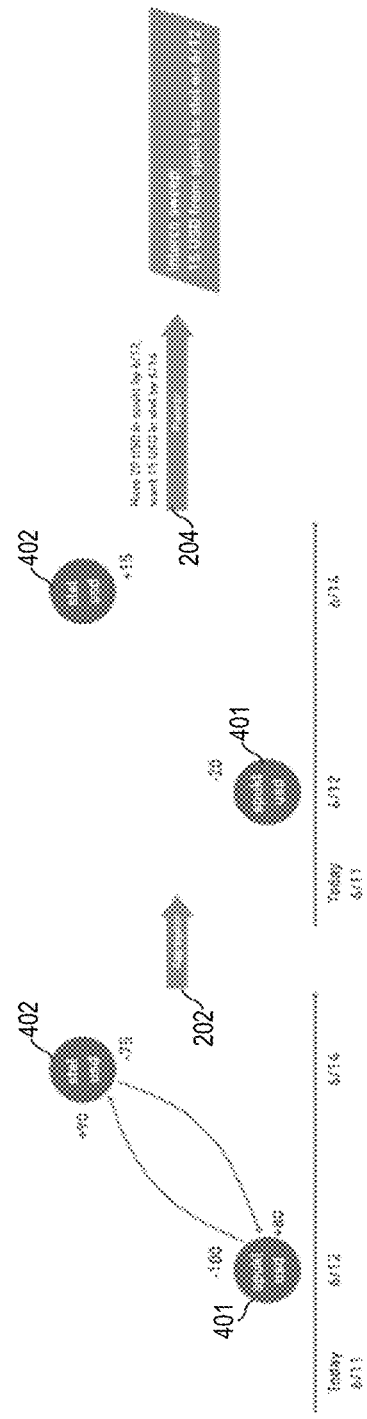
FIG. 4 illustrates an example of one embodiment of the liquidity engine handling inter-company liability.

FIG. 4 illustrates an example of one embodiment of the liquidity engine handling inter-company liability. Referring to FIG. 4, two nodes 401 and 402 of the graph are shown. Node 401 has an out leg to node 402 that has −100 USD and an in leg from node 402 with +80 USD, while node 402 has an in leg from node 401 with a +90 USD and an out leg to node 401 with a −75 USD. Aggregator 202 nets the amounts at node 401 to a netted position of −20 USD and the amounts at node 402 to a netted position of +15 USD. Assuming today is June 11, planner 204 looks at the aggregated positions, determines to issue an inter-company sweep of 15 USD from companies spukl to stel.

Figure 5:
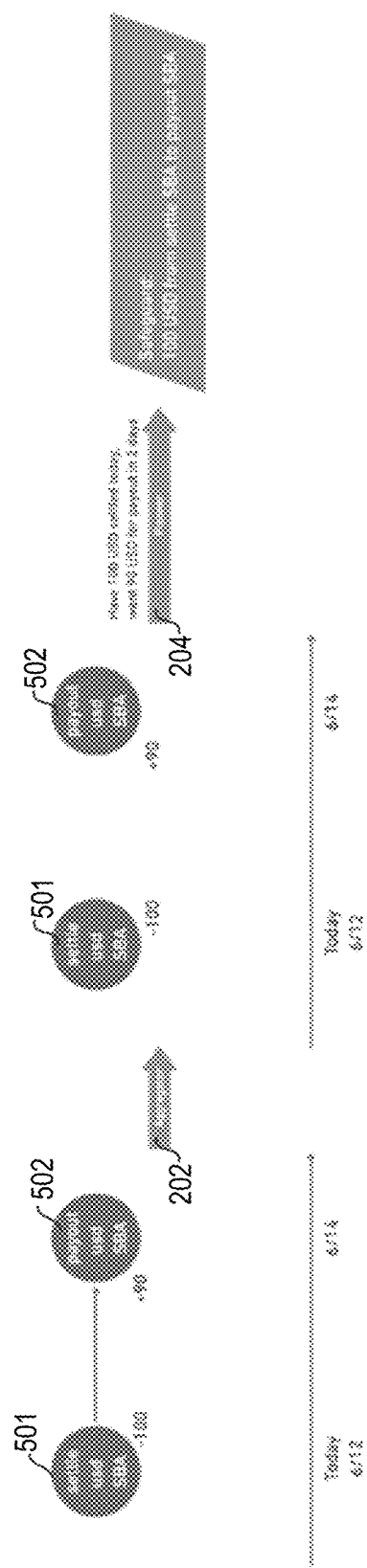
FIG. 5 illustrates an example of one embodiment of the liquidity engine handling receivable financing.

A receivable financing task 224 is one in which slow receivables are sold to a financial partner, in order to gain funds faster than otherwise settled by the network. FIG. 5 illustrates an example of one embodiment of the liquidity engine handling receivable financing.

Referring to FIG. 5, nodes 501 and 502 represent the same node on two different days where the in leg of node 501 is +90 USD on June 12 and the out leg of node 502 is −100 on June 14. Aggregator 202 performs aggregation on transaction but this does not change the netted amounts on these legs. Planner 204 determines that spukl is to have 100 USD by June 14 and wants 90 USD by June 12. Based on this information, planner 204 generates and executes a receivable financing task to buy 90 USD on June 12 and to sell 95 USD on June 14.

Note that in one embodiment, the liquidity engine can operate according to a number of finance policies. To do so, finance strategies may be deployed and used by the liquidity engine to optimize the working capital of the payment processor. Some example strategies include the following trading policies. A first trading policy is to limit risk. In such a case, planner 204 operates by extinguishing riskiest exposure first (e.g., one exposure is riskier than another exposure, so planner 204 will look to trade out of it first even if it is a relatively smaller dollar amount). A second trading policy is to limit cost. In such a case, planner 204 operates by choosing the least expensive trading path (e.g., trading less liquid currency pairs can be significantly more expensive that trading the most liquid pairs, so planner 204 will index towards the most liquid pairs). A third trading policy is to limit the need to trade. In such a case, when receivables are utilized to fund payables, planner 204 does not schedule a task to trade with an external partner, thereby limiting risk, reducing costs to 0, and accomplishing the funding very quickly. A fourth trading policy is to increase the efficiency of money movement. For example, in such a case, planner 204 finds the shortest and most optimal path to convert one currency for another (e.g., if funds acquired in the UK need to be paid out in CA the next day, planner 204 will prioritize using funds in CA first to meet short timelines). A fifth trading policy is to manage partner exposure. In such a case, in on embodiment, when trading FX with a bank, planner 204 merely swaps FX market risk for partner risk.

In one embodiment, controls are applied in certain situations. These may involve anomalous volumes or activity and are put in place to prevent any catastrophic errors, as well as make sure that the system is running as intended. While controls can be applied after an action, in one embodiment, controls are applied before planner 204 executes cash movement. For example, if the aggregated cash position is unusually large compared with recent peak volume, the controls might stop planner 204 from performing a cash transfer and alert for human investigation.

Referring back to FIG. 2, in one embodiment, the liquidity engine provides operational and analytical observability through an observability module 260. In one embodiment, the observability is live operational observability, such as, for example, instructed cash movement and reconciliation, near future liability, currency exposure, and to-be-balanced cash positions. In one embodiment, observability module 260 provides off-line analytical observability to derive business insight, such as per funds-flow merchant float or P&L.

In one embodiment, observability module 260 provides real-time observability for the near future liability, currency risk, and instructed cash movement. For example, in one embodiment, observability module 260 provides live observability on currency exposure, instructed cash movement, and to-be-balanced currency positions for the payment processor, and all cash movement is incorporated to cash forecast.

In one embodiment, observability module 260 links the transaction level data to the batch operations for cash movement, which allows for tracing the cash movement back to the set of transactions attributed to it. In this manner, transactions can be attributed to the trades through a query. Also, in one embodiment, observability module 260 provides ledgering in which both the transaction-level event and the batch cash movement is put in a ledger, thereby allowing cash movement to be traced back to the original transactions.

Figure 6A:
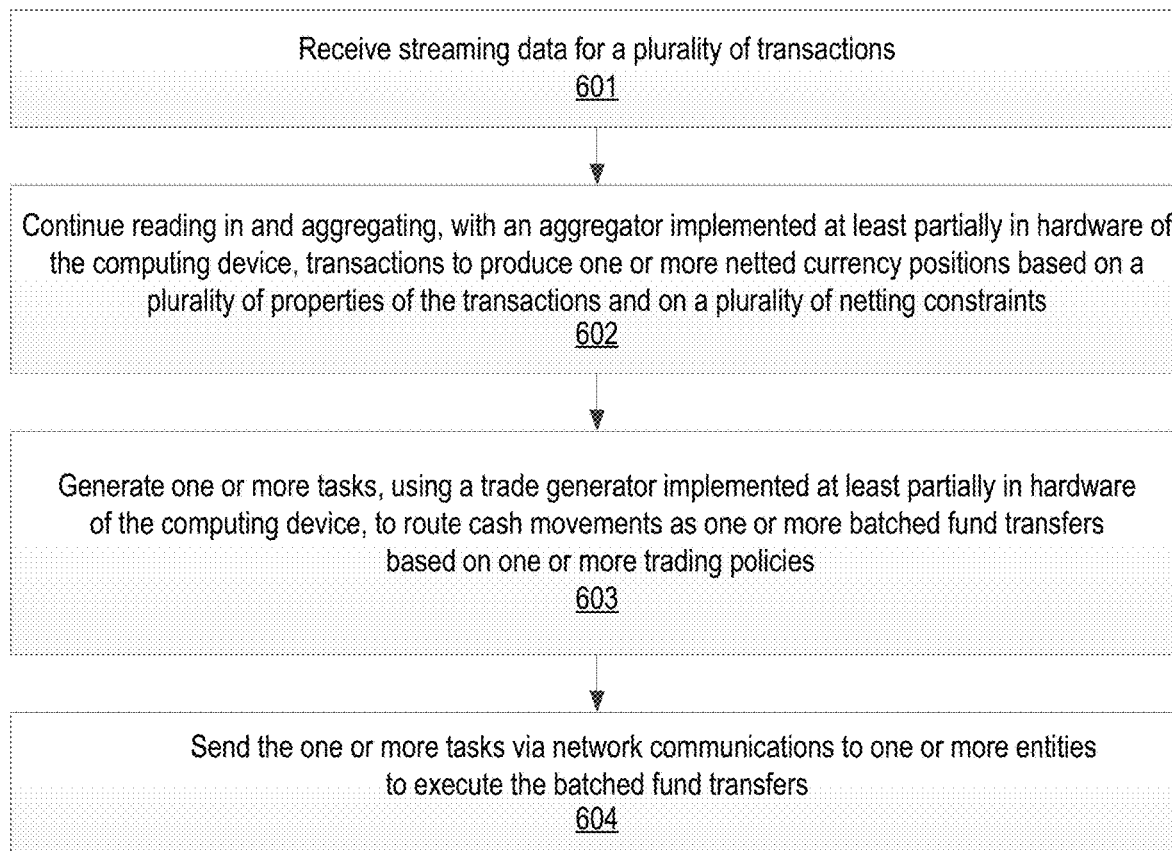
FIG. 6A is a flow diagram of one embodiment of a process for processing transaction with a liquidity engine.

FIG. 6A is a flow diagram of one embodiment of a process for processing transactions with a liquidity engine. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In one embodiment, the process is performed by a system or other computing device comprising a network interface, a memory to store instructions and one or more processors to execute instructions to run a liquidity engine as described herein.

Referring to FIG. 6A, the process begins by receiving streaming data for a plurality of transactions (processing block 601). In an alternative embodiment, the data for plurality of transactions is received by performing periodic sweeps of the transaction data. In one embodiment, each of the transaction information for each of the transactions comprises a location, currency, amount and date. The periodic sweeps of the transaction data may be performed by accessing one or more databases that store transaction data and running queries to obtain the transaction data.

Using the obtained transaction data, processing logic continuously reads in and aggregates transaction data to produce one or more netted currency positions based on a plurality of properties of the transactions and on a plurality of netting constraints (processing block 602). In one embodiment, the netting constraints including legal and business constraints. In one embodiment, aggregating transaction information comprises aggregating transaction level commitment to compute capital requirements associated with the plurality of transactions and determining a net out cash imbalance based on legal and business constraints. In one embodiment, the transaction data is received and aggregated with an aggregator that is implemented at least partially in hardware of a computing device.

In one embodiment, the transaction data comprises information specifying a prediction of funds that are to land in an account at a future date as part of settling each of the plurality of transactions. In such a case, one embodiment of the process includes predicting funds to land in an account at a future date as part of settling each of the plurality of transactions. In one embodiment, the predicted funds are generated using machine learning. In one embodiment, when the data received by the aggregator includes predicted funds as specified above, aggregating transaction information comprises aggregating predicted funds to calculate the one or more netted currency positions.

After aggregating transaction data, processing logic generates one or more tasks to route cash movements as one or more batched fund transfers based on one or more trading policies (processing block 603). In one embodiment, the one or more tasks to route cash movements are made using a trade generator implemented at least partially in hardware of a computing device, which may be the same or different than the computing device performing the aggregation. In one embodiment, the cash movement tasks comprises one or more bank or financial institution trades.

After one or more cash movement tasks, processing logic sends the one or more tasks via network communications to one or more entities to execute the batched fund transfers (processing block 604).

FIG. 6B is a flow diagram of another embodiment of a process for processing transaction data with a liquidity engine. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In one embodiment, the process is performed by a system or other computing device comprising a network interface, a memory to store instructions and one or more processors to execute instructions to run a liquidity engine as described herein.

Referring to FIG. 6B, the process begins by processing logic representing a currency position as a node in a liquidity graph in which each node includes a funds-in leg and a funds-out leg (processing block 611). In one embodiment, the currency position for each node is represented based on currency, location (e.g., bank number) and availability date. In one embodiment, as receiving a new transaction is received, processing logic adding an edge (node) to the graph based on the new transaction, and the edge includes a funds-in leg and a funds-out leg.

Processing logic also predicts funds for the funds-in leg as a prediction an amount of funds to land in an account at a future date (processing block 612). In one embodiment, predicting the funds for the funds-in leg is performed using machine learning (ML). In one embodiment, the prediction is a prediction of an amount of funds to land in the account at a future date based on streaming events.

Using the predicted data, processing logic aggregates the funds for the funds-in leg and the funds-out leg into netted positions (processing block 613). The netted positions represent an expected cash imbalance. Thus, based on the based on predicted data, processing logic calculate expected cash imbalance. In the case that the funds are predicted using ML, the processing logic aggregates ML-based predictions. In one embodiment, the processing block uses an aggregator to perform the aggregation.

After aggregating transaction data, processing logic generates one or more tasks to route cash movements as one or more batched fund transfers based on one or more trading policies (processing block 614). In one embodiment, the one or more tasks to route cash payments are to balance one or more cash positions using the batched fund transfers. In one embodiment, the one or more tasks to route cash movements are made using a trade generator implemented at least partially in hardware of a computing device, which may be the same or different than the computing device performing the aggregation. In one embodiment, the cash movement tasks comprises one or more bank or financial institution trades.

Figure 6C:
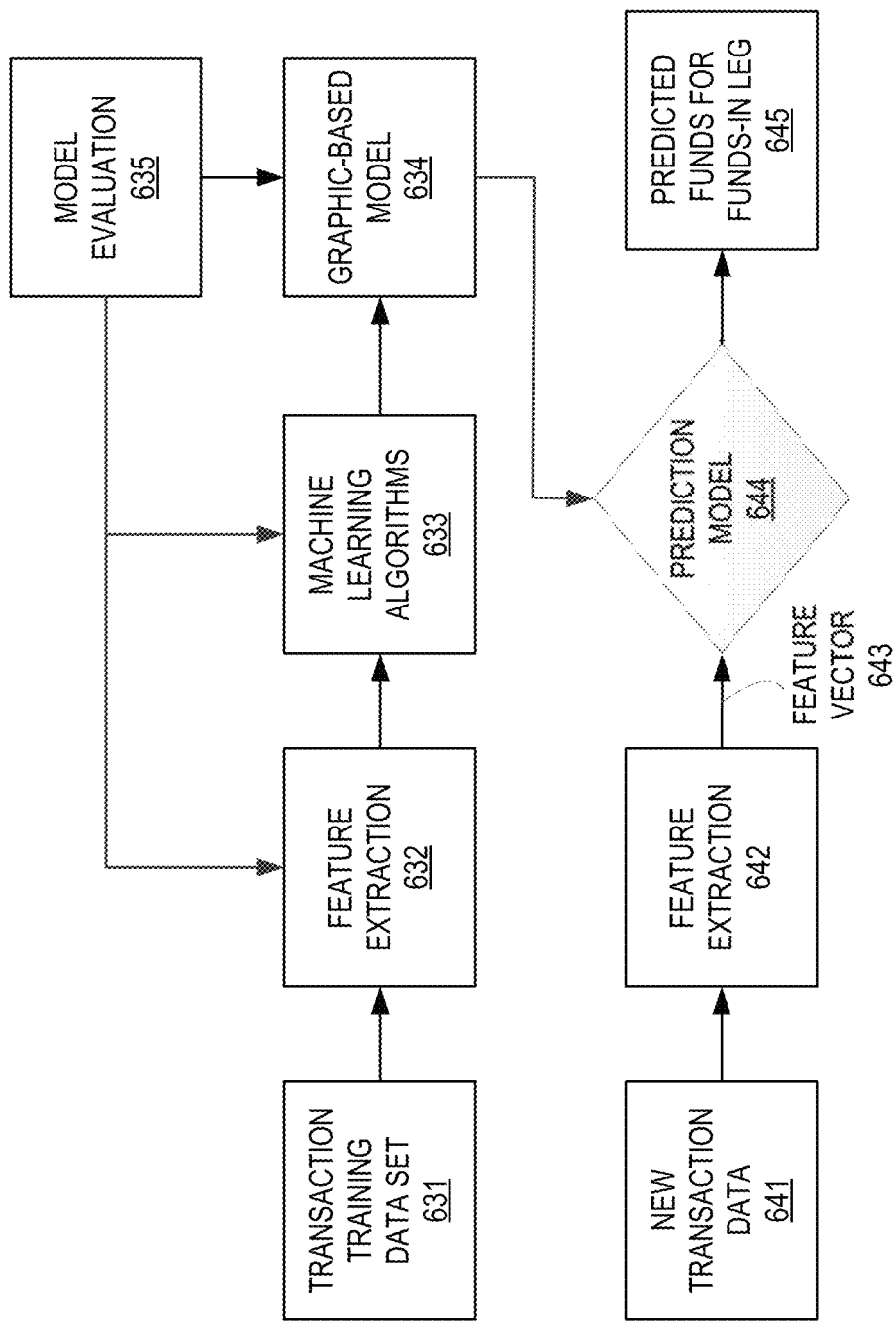
FIG. 6C is a block diagram of a machine learning (ML)-based settlement fund prediction mechanism.

FIG. 6C is a block diagram of a machine learning (ML)-based settlement fund prediction mechanism. Referring to FIG. 6C, a graph-based model 634 in which nodes have edges with funds-in and funds-out legs is generated from one or more ML algorithms 633 that are run on feature sets extracted via feature extraction 632 from transaction training data set 631 and analysis and feedback from model evaluation 635. The creation of a graph-based model using ML algorithms, feature extraction and model evaluation is well-known in the art.

The prediction model 644 corresponding to graph-based model 634 is formulated to generate predicted funds data 645 for the funds-in leg based on feature vectors 643 of features extracted using feature extraction 642 from new transaction data 641.

In one embodiment, cash movements start or end (or both) at accounts referred to herein as slush bank accounts. A slush payment processor bank account (e.g., Stripe bank account (SBA), etc.) is the place that funds stay temporarily on their path in and out of the payment processor. In other words, the slush bank account is the connection point between incoming and outgoing flows. In one embodiment, if a user never paid out their balance, it would be the SBA holding those funds. In one embodiment, for most merchants, the slush SBA is the merchant's default payout account.

In one embodiment, all acquiring (e.g., incoming) funds flow result in movement from the place of settlement to the slush account implied by the tag, and all payout funds flow result in movement from the default slush account to the payout SBA. In one embodiment, the payment processor does not directly connect cash inflows and outflows and uses the slush account as the connection point to management cash flow.

In one embodiment, all fund flows have one at least one end at a slush account and all funds pass through their slush account on their way through the payment processor. In one embodiment, the liquidity engine examines the tagging to identify and extract transactions for aggregation to perform the netting by getting funds to and from the slush account. In one embodiment, a merchant may have multiple slush accounts. For example, one slush account per currency and cash type (e.g., e-money, processing, banking).

An Example Computer System

Figure 7:
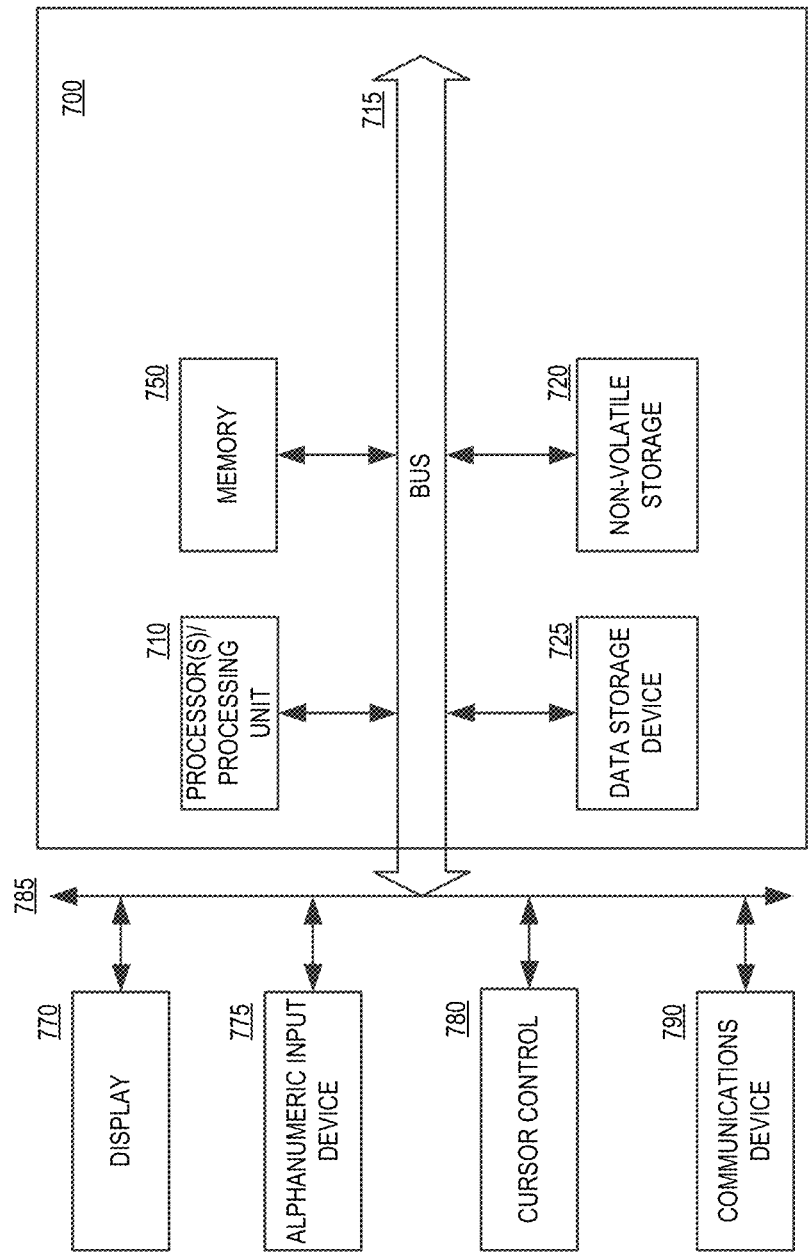
FIG. 7 is one embodiment of a computer system that may be used to support the systems and operations discussed herein.

FIG. 7 is one embodiment of a computer system that may be used to support the systems and operations discussed herein. It will be apparent to those of ordinary skill in the art, however, that other alternative systems of various system architectures may also be used.

The data processing system illustrated in FIG. 7 includes a bus or other internal communication means 715 for communicating information, and a processor(s) 710 coupled to the bus 715 for processing information. The system further comprises a random-access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor(s) 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

In one embodiment, processor(s) 710 executes instructions to perform any of the operations described above including, but not limited to, aggregating transaction data to created netted positions, generating and sending tasks or trades to perform cash movements based on the netted positions. Other operations also including predicting (e.g., ML-based predicting) of an amount of funds to land in an account at a future date (e.g., predicting funds for the funds-in leg part of a node of a graph used to model settlement funds).

It will be appreciated by those of ordinary skill in the art that any configuration of the system may be used for various purposes according to the particular implementation. The control logic or software implementing the described embodiments can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The embodiments discussed herein may also be embodied in a handheld or portable device containing a subset of the computer hardware components described above. For example, the handheld device may be configured to contain only the bus 785, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need to be present for the device to function.

There are a number of example embodiments described herein.

Example 1 is a method implemented by a computing device and comprises: receiving streaming data for a plurality of transactions; continuously reading in and aggregating, with an aggregator implemented at least partially in hardware of the computing device, transactions to produce one or more netted currency positions based on a plurality of properties of the transactions and on a plurality of netting constraints; generating one or more tasks, using a trade generator implemented at least partially in hardware of the computing device, to route cash movements as one or more batched fund transfers based on one or more trading policies; and sending the one or more tasks via network communications to one or more entities to execute the batched fund transfers.

Example 2 is the method of example 1 that may optionally include predicting funds to land in an account at a future date as part of settling each of the plurality of transactions, wherein aggregating transaction information comprises aggregating predicted funds to calculate the one or more netted currency positions.

Example 3 is the method of example 1 that may optionally include representing a currency position as a node in a liquidity graph, wherein the currency position is per currency, location and availability date, wherein the node includes a funds-in leg and a funds-out leg; and aggregating, with the aggregator, the funds for the funds-in leg and the funds-out leg.

Example 4 is the method of example 3 that may optionally include predicting the funds for the funds-in leg as a prediction an amount of funds to land in an account at a future date.

Example 5 is the method of example 4 that may optionally include that predicting the funds for the funds-in leg is performed using machine learning.

Example 6 is the method of example 1 that may optionally include that each of the transaction information for each of the transactions comprises a location, currency, amount and date.

Example 7 is the method of example 1 that may optionally include that the netting constraints including legal and business constraints.

Example 8 is the method of example 1 that may optionally include that aggregating transaction information comprises: aggregating transaction level commitment to compute capital requirements associated with the plurality of transactions; and determining a net out cash imbalance based on legal and business constraints.

Example 9 is one or more non-transitory computer readable storage media having instructions stored thereupon which, when executed by a system having at least a processor and a memory therein, cause the system to perform operations comprising: receiving streaming data for a plurality of transactions; continuously reading in and aggregating, with an aggregator implemented at least partially in hardware of the computing device, transactions to produce one or more netted currency positions based on a plurality of properties of the transactions and on a plurality of netting constraints; generating one or more tasks, using a trade generator implemented at least partially in hardware of the computing device, to route cash movements as one or more batched fund transfers based on one or more trading policies; and sending the one or more tasks via network communications to one or more entities to execute the batched fund transfers.

Example 10 is the storage media of example 9 that may optionally include predicting funds to land in an account at a future date as part of settling each of the plurality of transactions, wherein aggregating transaction information comprises aggregating predicted funds to calculate the one or more netted currency positions.

Example 11 is the storage media of example 9 that may optionally include that the operations further comprise: representing a currency position as a node in a liquidity graph, wherein the currency position is per currency, location and availability date, wherein the node includes a funds-in leg and a funds-out leg; and aggregating, with the aggregator, the funds for the funds-in leg and the funds-out leg.

Example 12 is the storage media of example 11 that may optionally include that the operations further comprise predicting the funds for the funds-in leg as a prediction an amount of funds to land in an account at a future date.

Example 13 is the storage media of example 12 that may optionally include that predicting the funds for the funds-in leg is performed using machine learning.

Example 14 is the storage media of example 9 that may optionally include that each of the transaction information for each of the transactions comprises a location, currency, amount and date.

Example 15 is the storage media of example 9 that may optionally include that aggregating transaction information comprises: aggregating transaction level commitment to compute capital requirements associated with the plurality of transactions; and determining a net out cash imbalance based on legal and business constraints.

Example 16 is a system comprising: a network interface to receive data for a plurality of transactions; a memory to store instructions; and one or more processors coupled to the memory, and the network interface to execute the stored instructions to run a liquidity engine to perform operations that include continuously reading in and aggregating, with an aggregator, transactions to produce one or more netted currency positions based on a plurality of properties of the transactions and on a plurality of netting constraints; generating one or more tasks, using a trade generator, to route cash movements as one or more batched fund transfers based on one or more trading policies; and sending, via the network interface, the one or more tasks to one or more entities to execute the batched fund transfers.

Example 17 is the system of example 16 that may optionally include that the liquidity engine is operable to predict funds to land in an account at a future date as part of settling each of the plurality of transactions, wherein aggregating transaction information comprises aggregating predicted funds to calculate the one or more netted currency positions.

Example 18 is the system of example 16 that may optionally include that the liquidity engine is operable to: represent a currency position as a node in a liquidity graph, wherein the currency position is per currency, location and availability date, wherein the node includes a funds-in leg and a funds-out leg; and aggregate, with the aggregator, the funds for the funds-in leg and the funds-out leg.

Example 19 is the system of example 18 that may optionally include that the liquidity engine is operable to predict, using machine learning, the funds for the funds-in leg as a prediction an amount of funds to land in an account at a future date.

Example 20 is the system of example 16 that may optionally include that the liquidity engine is operable to aggregate transaction information by: aggregating transaction level commitment to compute capital requirements associated with the plurality of transactions; and determining a net out cash imbalance based on legal and business constraints.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A computer-implemented method, comprising:
receiving, by a network interface, streaming data for a plurality of transactions;
continuously reading in and aggregating, with an aggregator implemented at least partially in first hardware resources of a first processing system of a distributed processing system, the transactions to produce one or more netted currency positions based on a plurality of properties of the transactions and on a plurality of netting constraints, comprising:
generating, by the first processing system, a liquidity graph having one or more nodes that represent one or more currency positions, wherein each node includes an input leg associated with funds flowing into said each node and an output leg associated with funds flowing out of said each node, wherein each of the one or more currency positions is generated based on a combination of currency, location and availability date,
predicting, by the first processing system using machine learning, a machine-learning based prediction funds for the input leg of said each node as a prediction of an amount of funds to land in an account at a future date based on the streaming data, and
aggregating, with the aggregator implemented by the first processing system, funds based on input legs and output legs of said each node; and
planning, by second hardware resources of a second processing system of the distributed processing system asynchronous to the aggregating performed by the first processing system, transfer of funds based on the aggregated funds, comprising:
periodically generating one or more tasks, using a trade generator implemented at least partially by the second processing system, to route cash movements as one or more batched fund transfers based on one or more trading policies, and
sending, by the second processing system, the one or more tasks via network communications to one or more entities to execute the batched fund transfers; and
wherein an amount of the first hardware resources allocated to the first processing system scales according to a volume of the streaming data and the amount of the first hardware resources scales independent of an amount of the second hardware resources allocated to the planning performed by the second processing system.

2. The method of claim 1 further comprising predicting funds to land in the account at the future date as part of settling each of the plurality of transactions, wherein aggregating transaction information comprises aggregating predicted funds to calculate the one or more netted currency positions.

3. The method of claim 1 wherein each of the transaction information for each of the transactions comprises a location, currency, amount and date.

4. The method of claim 1 wherein the netting constraints including legal and business constraints.

5. The method of claim 1 wherein aggregating transaction information comprises:
aggregating transaction level commitment to compute capital requirements associated with the plurality of transactions; and
determining a net out cash imbalance based on legal and business constraints.

6. One or more non-transitory computer readable storage media having instructions stored thereupon which, when executed by a system having at least a processor and a memory therein, cause the system to perform operations comprising:
receiving, by a network interface, streaming data for a plurality of transactions;
continuously reading in and aggregating, with an aggregator implemented at least partially in first hardware resources of a first processing system of a distributed processing system, the transactions to produce one or more netted currency positions based on a plurality of properties of the transactions and on a plurality of netting constraints, comprising:
generating, by the first processing system, a liquidity graph having one or more nodes that represent one or more currency positions, wherein each node includes an input leg associated with funds flowing into said each node and an output leg associated with funds flowing out of said each node, wherein each of the one or more currency positions is generated based on a combination of currency, location and availability date,
predicting, by the first processing system using machine learning, a machine-learning based prediction funds for the input leg of said each node as a prediction of an amount of funds to land in an account at a future date based on the streaming data, and
aggregating, with the aggregator implemented by the first processing system, funds based on input legs and output legs of said each node; and
planning, by second hardware resources of a second processing system of the distributed processing system asynchronous to the aggregating performed by the first processing system, transfer of funds based on the aggregated funds, comprising:
periodically generating one or more tasks, using a trade generator implemented at least partially by the second processing system, to route cash movements as one or more batched fund transfers based on one or more trading policies, and
sending, by the second processing system, the one or more tasks via network communications to one or more entities to execute the batched fund transfers; and
wherein an amount of the first hardware resources allocated to the first processing system scales according to a volume of the streaming data and the amount of the first hardware resources scales independent of an amount of the second hardware resources allocated to the planning performed by the second processing system.

7. The storage media of claim 6 further comprising predicting funds to land in the account at the future date as part of settling each of the plurality of transactions, wherein aggregating transaction information comprises aggregating predicted funds to calculate the one or more netted currency positions.

8. The storage media of claim 6 wherein each of the transaction information for each of the transactions comprises a location, currency, amount and date.

9. The storage media of claim 6 wherein aggregating transaction information comprises:
- aggregating transaction level commitment to compute capital requirements associated with the plurality of transactions; and
- determining a net out cash imbalance based on legal and business constraints.

10. A distributed system comprising:
- a network interface to receive data for a plurality of transactions;
- a first processing system comprising first hardware resources, communicatively coupled with the network interface, and configured to perform operations comprising:
  - continuously reading in and aggregating, with an aggregator implemented at least partially in the first hardware resources of the first processing system of a distributed processing system, the transactions to produce one or more netted currency positions based on a plurality of properties of the transactions and on a plurality of netting constraints, comprising:
    - generating, by the first processing system, a liquidity graph having one or more nodes that represent one or more currency positions, wherein each node includes an input leg associated with funds flowing into said each node and an output leg associated with funds flowing out of said each node, wherein each of the one or more currency positions is generated based on a combination of currency, location and availability date,
    - predicting, by the first processing system using machine learning, a machine-learning based prediction funds for the input leg of said each node as a prediction of an amount of funds to land in an account at a future date based on the streaming data, and
    - aggregating, with the aggregator implemented by the first processing system, funds based on input legs and output legs of said each node; and
- a second processing system comprising second hardware resources, communicatively coupled with the first processing system, and configured to perform operations comprising:
  - planning, by the second hardware resources of the second processing system of the distributed processing system asynchronous to the aggregating performed by the first processing system, transfer of funds based on the aggregated funds, comprising:
    - periodically generating one or more tasks, using a trade generator implemented at least partially by the second processing system, to route cash movements as one or more batched fund transfers based on one or more trading policies, and
    - sending, by the second processing system via the network interface, the one or more tasks to one or more entities to execute the batched fund transfers; and
- wherein an amount of the first hardware resources allocated to the first processing system scales according to a volume of the streaming data and the amount of the first hardware resources scales independent of an amount of the second hardware resources allocated to the planning performed by the second processing system.

11. The distributed system of claim 10 wherein the liquidity engine is operable to predict funds to land in the account at the future date as part of settling each of the plurality of transactions, wherein aggregating transaction information comprises aggregating predicted funds to calculate the one or more netted currency positions.

12. The distributed system of claim 10 wherein the liquidity engine is operable to aggregate transaction information by:
- aggregating transaction level commitment to compute capital requirements associated with the plurality of transactions; and
- determining a net out cash imbalance based on legal and business constraints.

* * * * *